United States Patent
Afzal

(10) Patent No.: US 11,047,988 B2
(45) Date of Patent: Jun. 29, 2021

(54) METHOD AND APPARATUS FOR REDUCING TROPOSPHERIC EFFECTS IN GNSS POSITIONING

(71) Applicant: RX NETWORKS INC., Vancouver (CA)

(72) Inventor: Muhammad Haris Afzal, Vancouver (CA)

(73) Assignee: Rx Networks Inc., Vancouver (CA)

(*) Notice: Subject to any disclaimer, the term of this patent is extended or adjusted under 35 U.S.C. 154(b) by 215 days.

(21) Appl. No.: 16/312,138

(22) PCT Filed: Jun. 9, 2017

(86) PCT No.: PCT/CA2017/050716
§ 371 (c)(1),
(2) Date: Dec. 20, 2018

(87) PCT Pub. No.: WO2017/219126
PCT Pub. Date: Dec. 28, 2017

(65) Prior Publication Data
US 2019/0227179 A1      Jul. 25, 2019

Related U.S. Application Data

(60) Provisional application No. 62/354,397, filed on Jun. 24, 2016.

(51) Int. Cl.
*G01S 19/41* (2010.01)
*G01S 19/07* (2010.01)
*G01S 19/00* (2010.01)

(52) U.S. Cl.
CPC ............ *G01S 19/41* (2013.01); *G01S 19/07* (2013.01)

(58) Field of Classification Search
CPC ........ G01S 19/41; G01S 19/07; G01S 19/071; G01S 19/073
See application file for complete search history.

(56) References Cited

U.S. PATENT DOCUMENTS 5,323,322 A * 6/1994 Mueller ............... G01S 19/071
701/471
5,563,917 A * 10/1996 Sheynblat ............. G01S 19/41
375/346

(Continued)

FOREIGN PATENT DOCUMENTS

| CN | 104777488 A | 7/2015 |
|---|---|---|
| CN | 105182366 A | 12/2015 |
| WO | 2012151006 A1 | 11/2012 |

OTHER PUBLICATIONS

European Patent Application No. 17814366.5, Extended European Search Report dated Jan. 23, 2020.

(Continued)

*Primary Examiner* — Bernarr E Gregory
(74) *Attorney, Agent, or Firm* — Borden, Ladner, Gervais, LLP; Geoffrey deKleine

(57) ABSTRACT

A method of reducing tropospheric effects in GNSS positioning includes determining a tropospheric delay by: determining zenith delays for geographical areas along a path of GNSS signal travel between a GNSS satellite and the first location of the electronic device, the zenith delays determined using current weather information of the geographical areas, the geographical areas traversed by the path represented by cells of a grid, the cells comprising a selected size; determining path delays for the geographical areas by adjusting the zenith delays based on an angle of the GNSS satellite relative to the electronic device; and summing the path delays to determine the tropospheric delay.

12 Claims, 7 Drawing Sheets

(56) References Cited

U.S. PATENT DOCUMENTS

| | | | | |
|---|---|---|---|---|
| 5,828,336 | A | * | 10/1998 | Yunck ................... G01S 19/07 342/357.31 |
| 8,044,849 | B2 | * | 10/2011 | Ferguson .............. G01S 19/073 342/357.44 |
| 2005/0146461 | A1 | * | 7/2005 | Pande ................... G01S 19/07 342/357.44 |
| 2007/0027624 | A1 | | 2/2007 | Powe et al. |
| 2010/0194639 | A1 | * | 8/2010 | Takeichi ................ G01S 19/07 342/357.59 |
| 2011/0187592 | A1 | | 8/2011 | Kappi |

OTHER PUBLICATIONS

International Patent Application No. PCT/CA2017/050716, International Preliminary Report on Patentability dated Jan. 3, 2019.
International Patent Application No. PCT/CA2017/050716, International Search Report and Written Opinion dated Sep. 22, 2017.

\* cited by examiner

METHOD AND APPARATUS FOR REDUCING TROPOSPHERIC EFFECTS IN GNSS POSITIONING

TECHNICAL FIELD

The present disclosure relates to use of local weather information to reduce delays due to Global Navigation Satellite System (GNSS) signal propagation through the troposphere for GNSS positioning systems.

BACKGROUND

Solutions to improve GNSS position fix accuracy continue to be sought as the number of services that rely on location grows. Accurate position fixes are particularly important when locating individuals in need of assistance but also add functionality and reliability to many location based services.

One source of error that affects position fix accuracy is the troposphere. GNSS signals propagating through the troposphere are subjected to ray bending, which increases a signal path length and causes a delay. If compensation for the tropospheric delay is not performed, or if the tropospheric delay is not accurately determined, the position fix by a GNSS receiver may be several metres away from an actual location of the GNSS receiver.

Improvements in tropospheric delay determination are therefore sought to improve the accuracy of location determination by GNSS receivers.

SUMMARY

In an aspect of the present disclosure there is provided a method of reducing tropospheric effects in GNSS positioning, the method comprising: determining, by a GNSS receiver of an electronic device, a first location of the electronic device at a first time; determining a tropospheric delay by: determining zenith delays for geographical areas along a path of GNSS signal travel between a GNSS satellite and the first location of the electronic device, the zenith delays determined using current weather information of the geographical areas, the geographical areas traversed by the path represented by cells of a grid, the cells comprising a selected size; determining path delays for the cells by adjusting the zenith delays based on an elevation angle of the GNSS satellite relative to the electronic device; and summing the path delays to determine the tropospheric delay; using the tropospheric delay to determine, by the GNSS receiver of the electronic device, a second location of the electronic device at a second time; wherein the second location has a higher accuracy than the first location.

In another aspect of the present disclosure there is provided an electronic device comprising: a GNSS receiver to determine a first location of the electronic device at a first time; a processor in communication with the GNSS receiver, the processor determining a tropospheric delay by: determining zenith delays for geographical areas along a path of GNSS signal travel between a GNSS satellite and the first location of the electronic device, the zenith delays determined using current weather information of the geographical areas, the geographical areas traversed by the path represented by cells of a grid, the cells comprising a selected size; determining path delays for the cells by adjusting the zenith delays based on an elevation angle of the GNSS satellite relative to the electronic device; and summing the path delays; wherein, using the tropospheric delay, the GNSS receiver determines a second location of the electronic device at a second time, the second location has a higher accuracy than the first location.

DRAWINGS

The following figures set forth examples in which like reference numerals denote like parts. The present disclosure is not limited to the examples illustrated in the accompanying figures.

DETAILED DESCRIPTION

Figure 1:
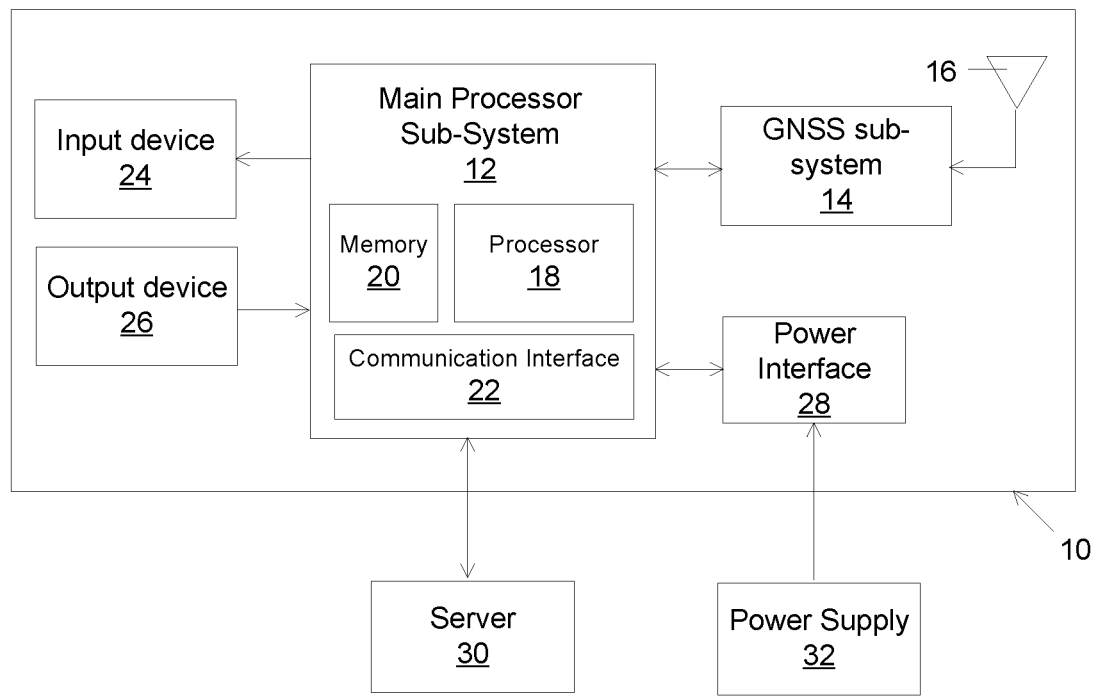
FIG. 1 is a schematic diagram of an example electronic device.

It will be appreciated that for simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. Unless explicitly stated, the methods described herein are not constrained to a particular order or sequence. Additionally, some of the described methods or elements thereof can occur or be performed at the same point in time. In other instances, well-known methods, procedures and components have not been described in detail so as not to obscure the examples described herein. Also, the description is not to be considered as limiting the scope of the examples described herein.

Referring to FIG. 1, an example electronic device 10 configured to perform the method of FIG. 2 is shown. The electronic device 10 includes a main processor sub-system 12 that controls overall operation of thereof. The main processor sub-system 12 includes a processor 18, a memory 20 and a communication interface 22, which enables communication with server(s) 30 via a wired or a wireless connection. An example of a main processor sub-system 12 is a Single Board Computer (SBC) with an Operating System (OS).

A GNSS receiver of the electronic device 10 includes a GNSS antenna 16 for receiving GNSS signals and a GNSS sub-system 14 in communication with the main processor sub-system 12 and the GNSS antenna 16. The GNSS sub-system 14 generates digitized GNSS data corresponding to the GNSS signals for further processing by the main processor sub-system 12. Examples of a GNSS sub-system 14 include: a standalone GNSS receiver capable of generating a location estimate locally, an Assisted GNSS (A-GNSS) receiver that receives assistance data from another device to provide a location estimate, a Radio Frequency (RF) Front End (FE) in association with a Software Defined Radio (SDR) receiver at the electronic device 10 or distributed over one or more servers 30 in wireless communication with the electronic device 10.

The electronic device 10 is powered by a power supply 32, which communicates with the main processor sub-system 12 via a power interface 28. In an example, the power supply 32 is one or more batteries. The electronic device 10 includes an output device 24 in communication with the main processor sub-system 12. The output device 24 may be one or more of: a display, a speaker and another type of output device, for example. The electronic device 10 includes an input device 26 in communication with the main processor sub-system 12 to receive user input, for example.

The electronic device 10 may be a Smartphone, tablet, portable computer, laptop computer, activity tracking device, beacon, router, Machine-to-machine (M2M) device or an in-vehicle navigation system, for example.

Figure 2A:
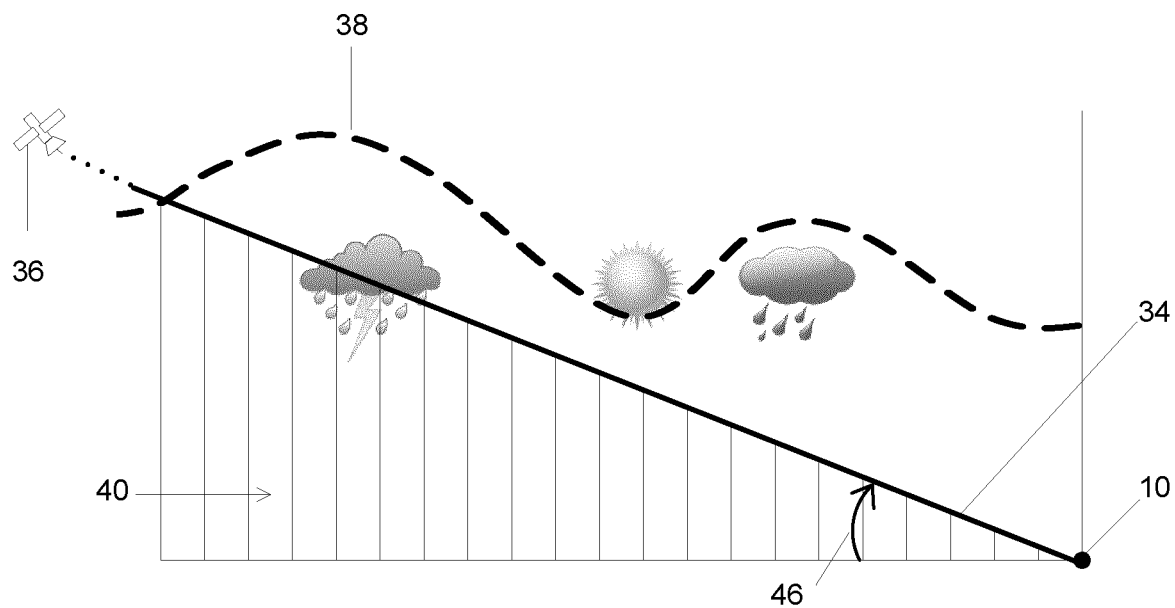
FIG. 2A is a side schematic representation of GNSS signals travelling from a GNSS satellite to a GNSS receiver of the electronic device of FIG. 1 through the troposphere across a geographical region.
Figure 2B:
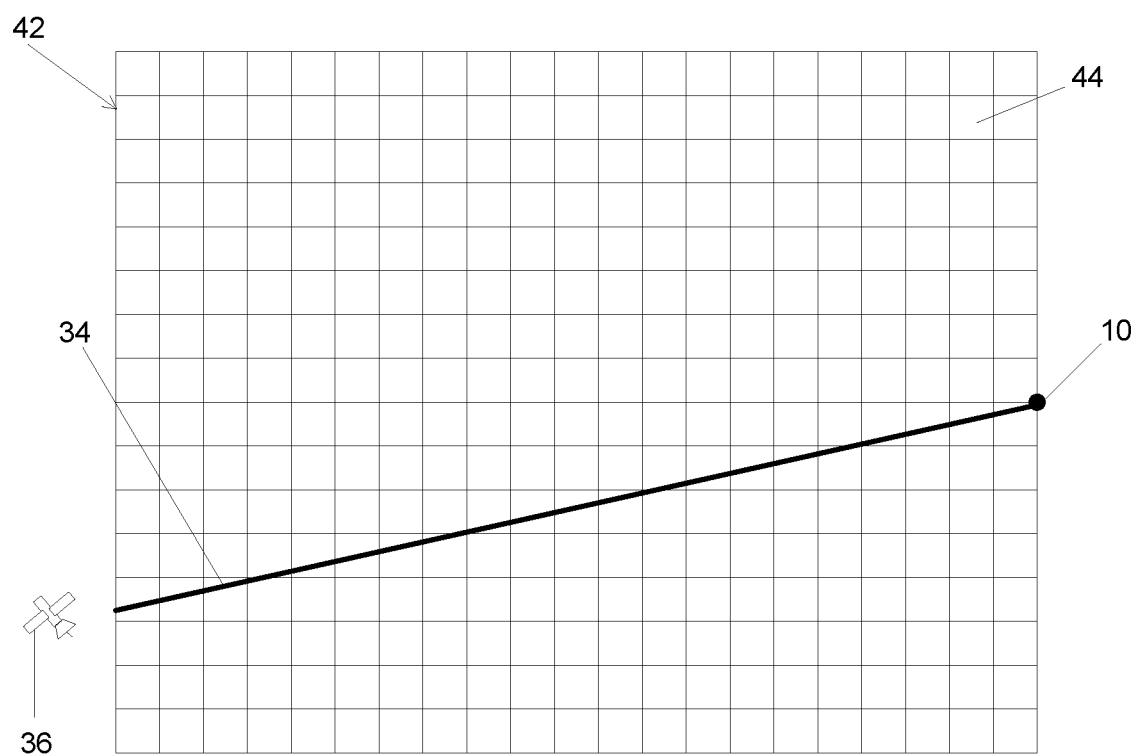
FIG. 2B is a top schematic representation of FIG. 2A.

Referring to FIG. 2A, a path 34 of GNSS signal travel from a GNSS satellite 36 to the electronic device 10 is shown. The GNSS satellite 36 is at an elevation angle 46 relative to the electronic device 10. Dashed line 38 represents an upper limit of the troposphere 40 above a particular geographical region at a particular time. Referring also to FIG. 2B, a grid 42 above the geographical region, is divided into cells 44 representing the geographical areas traversed by the path 34. Current weather information, which is specific to the geographical areas, is assigned to corresponding cells 44 of the grid 42 in order to perform a method of reducing tropospheric effects in GNSS positioning, which is shown in FIG. 3.

The method includes: at 50, determining, by a GNSS receiver of an electronic device 10, a first location of the electronic device 10 at a first time; at 52, determining zenith delays for geographical areas along a path 34 of GNSS signal travel between a GNSS satellite 36 and the first location of the electronic device 10, the zenith delays determined using current weather information of the geographical areas, the geographical areas traversed by the path 34 represented by cells 44 of a grid 42, the cells 44 comprising a selected size; at 54, determining path delays for the cells 44 by adjusting the zenith delays based on an elevation angle 46 of the GNSS satellite relative to the electronic device 10; and, at 56, summing the path delays to determine the tropospheric delay. At 58, the tropospheric delay is used to determine, by the GNSS receiver of the electronic device 10, a second location of the electronic device 10 at a second time. Because the tropospheric delay is included in the determination of the second location at the second time, the second location has a higher accuracy than the first location.

Figure 3:
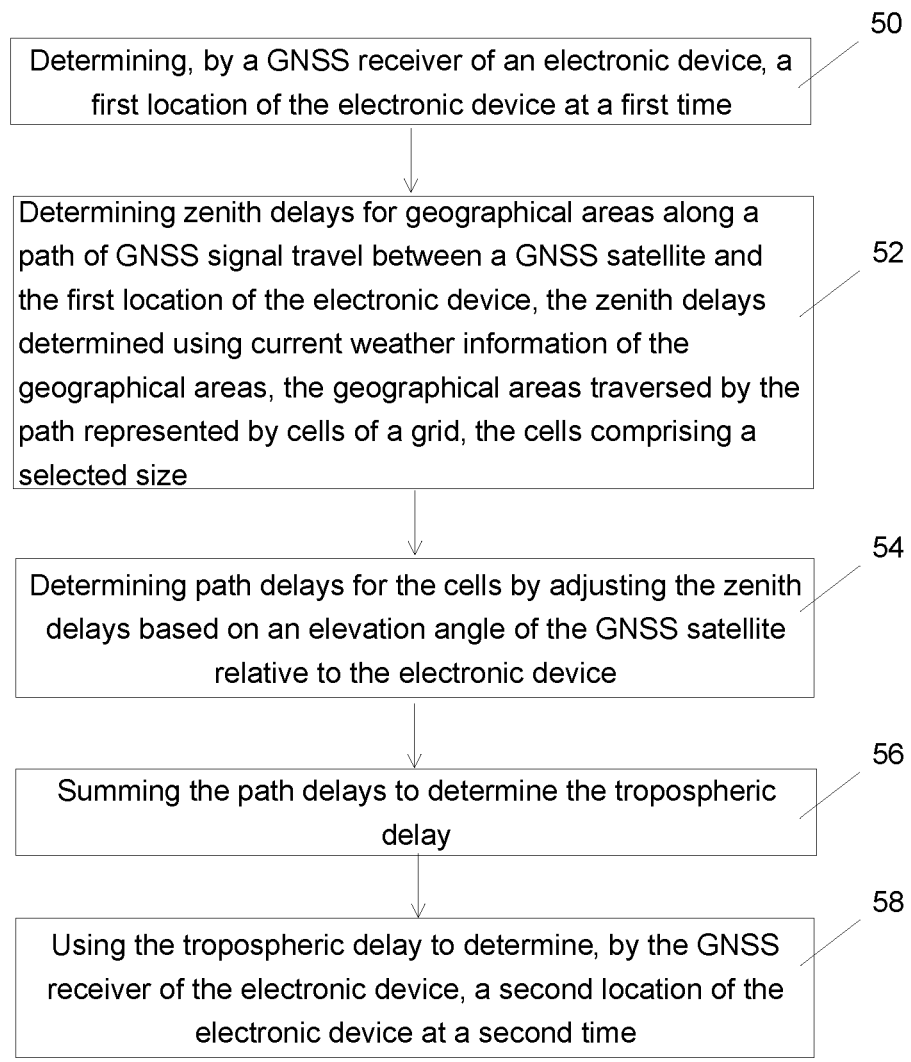
FIG. 3 is a method of reducing tropospheric effects in GNSS positioning according to an example usable by the device of FIG. 1.
Figure 4:
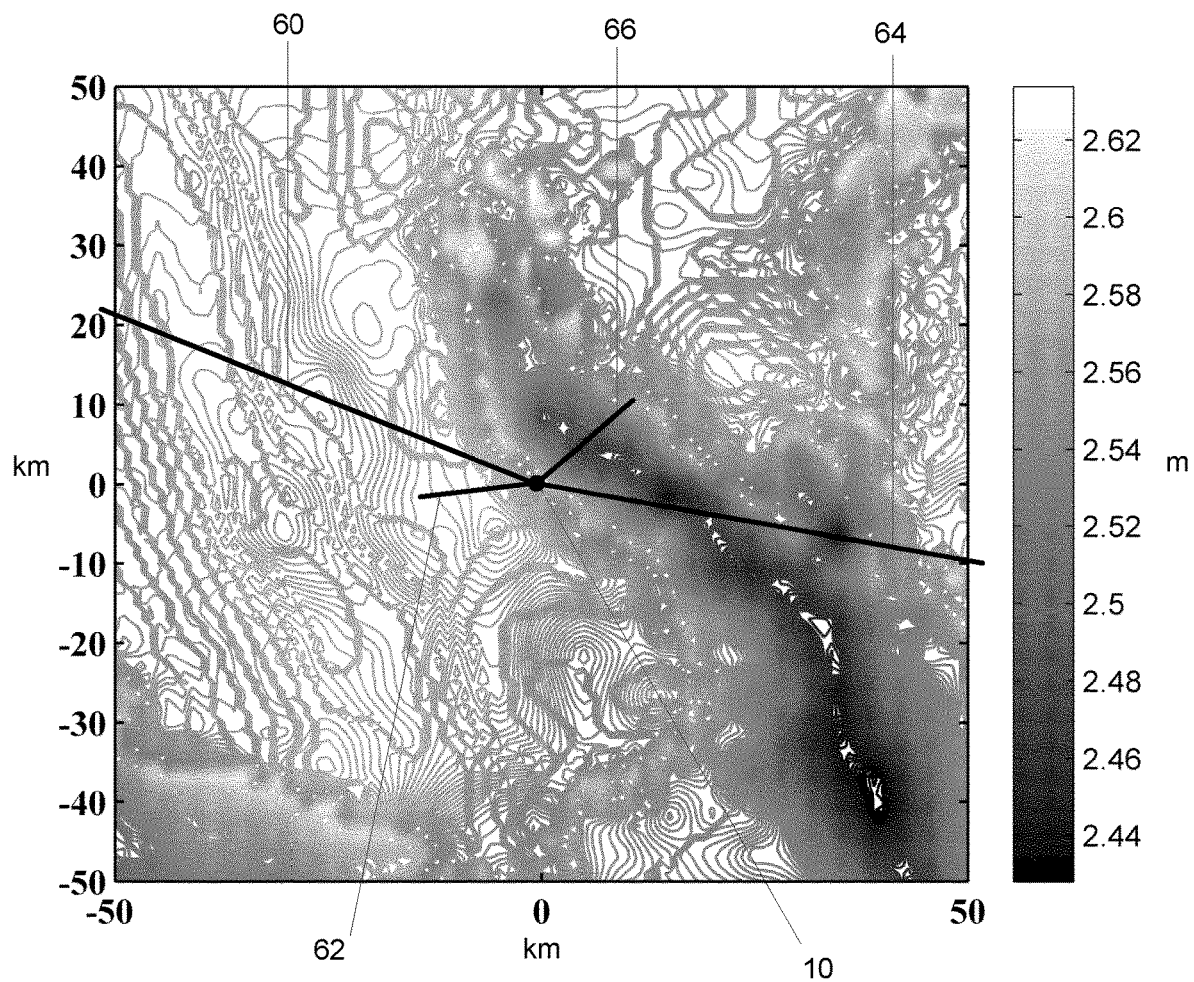
FIG. 4 is a graph depicting zenith delays calculated based on current weather conditions of geographical areas of a geographical region.

The method of FIG. 3 reduces tropospheric effects in GNSS positioning in order to improve location determination by GNSS receivers of electronic devices 10. Zenith delays for geographical areas of a geographical region are plotted by way of example in FIG. 4. The graph illustrates the differences in zenith delays due to current weather of the geographical areas. GNSS signals travelling from different GNSS satellites to the same GNSS receiver may experience significantly different tropospheric delays due to the varied weather conditions across the geographical region. As shown in FIG. 4, lines 60, 62, 64 and 66 represent paths from different GNSS satellites 36 to a GNSS receiver of an electronic device 10 located near the centre of the 100 km by 100 km geographical region. The paths 60, 62, 64 and 66 cross a series of geographical areas with respective zenith delays associated therewith, as shown. Paths 62 and 64 represent GNSS signal travel from satellites at relatively high elevations and paths 60 and 64 represent GNSS signal travel from satellites at relatively low elevations. As indicated by the zenith delays, which are used to determine tropospheric delays according to the method of FIG. 3, satellites that are at similar elevations with respect to the GNSS receiver of the electronic device 10 may have significantly different tropospheric delays associated therewith depending on the current weather conditions within the geographic region.

The method of reducing tropospheric effects in GNSS positioning may be performed by the main processor sub-system 12 of the electronic device 10 by executing one or more software applications that are stored in memory 20 as computer readable code. Alternatively, the method may be performed by dedicated hardware of the main processor sub-system 12, such as Application Specific Integrated Circuit (ASIC) or Graphics Processing Unit (GPU), for example, or by a combination of hardware and software. Parts of the method may alternatively be performed at one or more remote servers in communication with the electronic device 10.

In the example in which the method is performed entirely on the electronic device 10, current weather information is downloaded to the electronic device 10 and calculations are performed locally. In another example, the current weather information may alternatively be stored at the server 30 and sent to the electronic device 10 in response to a request. The method may then be performed locally. Alternatively, the method may be performed at the server 30 in response to requests from the electronic device 10 that include the first location of the electronic device 10 and the time associated with the first location. In this example, the tropospheric delay may be sent to the electronic device 10 together with assistance information including high accuracy orbits and clocks. The difference between the first time and the second time varies based on how the method is performed. According to the example in which the tropospheric delay is determined at the server 30, the difference between the first time and the second time is approximately one to two minutes. The time difference may be less than one minute or more than two minutes and depends, at least in part, on transmission latencies.

The current weather information includes: pressure at mean sea level, relative humidity and temperature. The current weather information is assigned to the cells 44 by storing the current weather information in association with the cells 44 in memory of the server 30 or the electronic device 10. The current weather information may be obtained from various weather service providers, such as CustomWeather Inc. and Environment Canada, for example. The current weather information is updated at regular intervals, such as at approximately 10 minute intervals, for example.

The cells 44 of the grid 42 have a selected size. In an example, the selected size is between 5 $km^2$ and 15 $km^2$. In another example, the selected size of the cells 44 is approximately 13 $km^2$. The cells 44 may be sized differently based on the type of geographical region. Further, the size of the cells 44 may be uniform or may be non-uniform across a geographical region.

Referring back to FIG. 2B, the zenith delays for the cells 44 of the grid 42 through which the path 34 extends are determined using a tropospheric delay model and the current weather information. Examples of tropospheric delay models usable to determine zenith delays are: Modified Hopfield and Black and Eisner.

Figure 5:
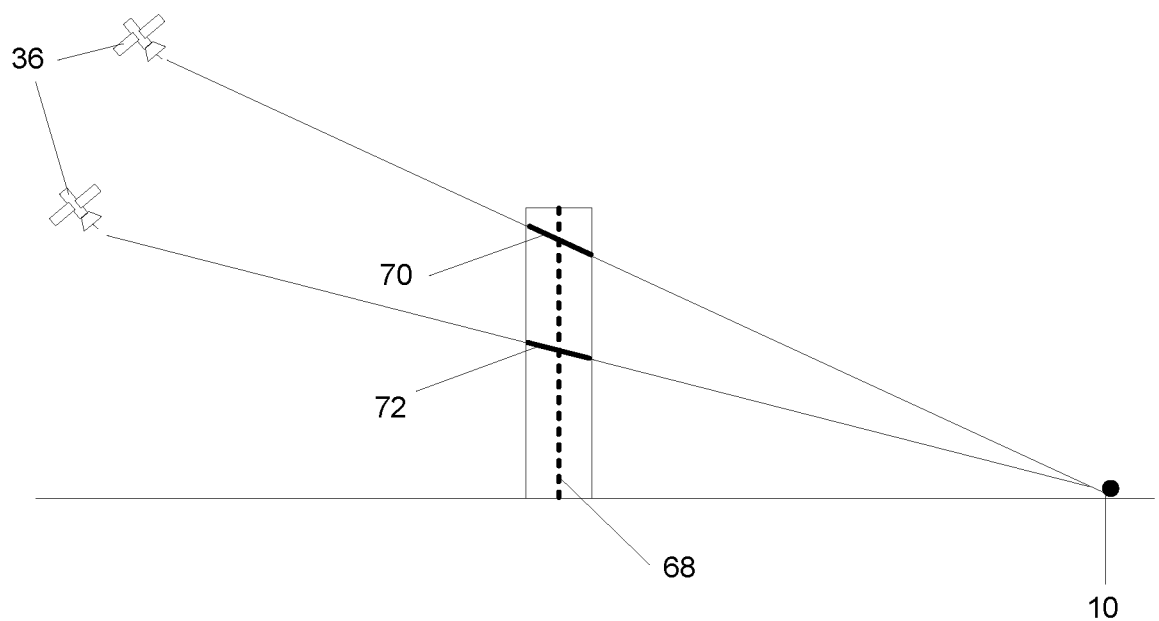
FIG. 5 is a schematic side view depicting a zenith delay and path delays for a cell of a grid representing a geographical area.

Path delays are determined for a geographical area by adjusting the zenith delay determined for a cell 44 representing the geographical area based on an angle of the GNSS satellite 36 relative to the electronic device 10. As shown in FIG. 5, line 68 represents the distance over which the zenith delay occurs for the cell 44. Lines 70 and 72 represent the distance over which the path delay is determined for the respective satellites 36 through the cell 44. After the distance over which the path delay occurs is geometrically determined, the path delay is determined using a second stage of the tropospheric delay model used to determine the zenith delay.

Modified Hopfield and Black and Eisner models are provided by way of example because these models include a first stage in which the zenith delay is determined and a second stage in which a path delay is determined. Other tropospheric delay models may alternatively be modified and applied in a similar manner to determine the tropospheric delay according to the method of FIG. 3. Such models include Hopfield, Saastamoinen Baby et al., and Ifadis, for example.

The method described herein is applicable to GNSS satellites 36 located above approximately five degrees of elevation relative to a GNSS receiver. As will be understood by persons skilled in the art, the tropospheric delay may be modeled as a time delay that is added to an arrival time of the GNSS signals at the electronic device 10. Alternatively, the tropospheric delay may be modeled as a distance that is added to a determined range from the GNSS satellite to the electronic device 10. In an example, the tropospheric effects may be compensated for such that the contribution to UERE (User Equivalent Range Error) due to troposphere is less than 2 cm.

Figure 6:
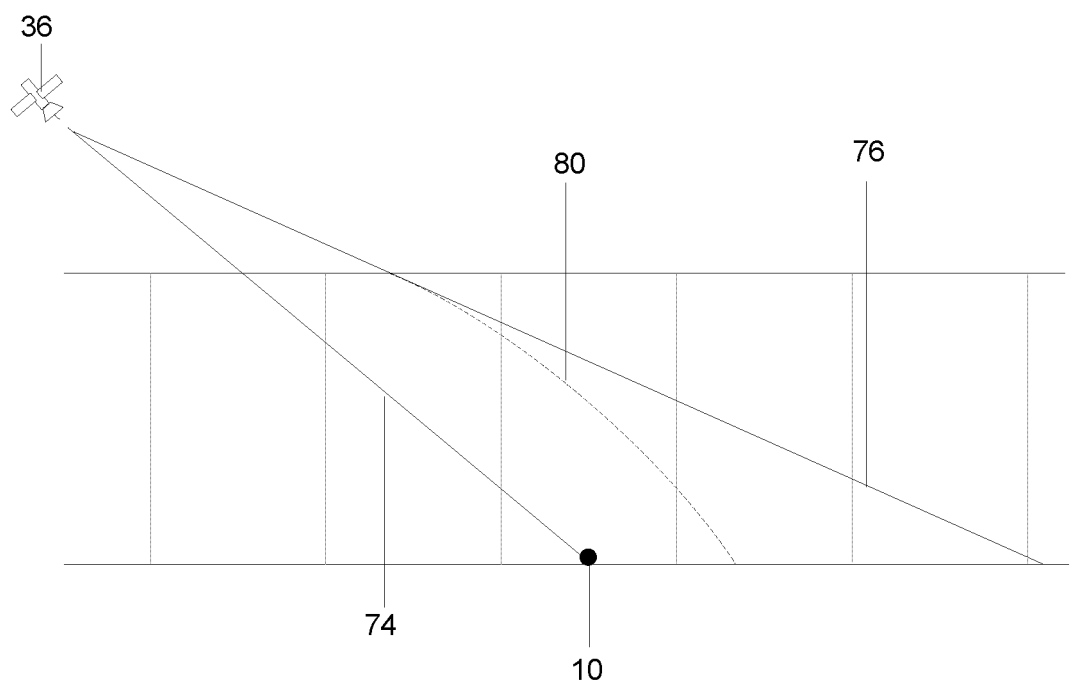
FIG. 6 is a schematic side view depicting actual range between a satellite and the electronic device of FIG. 1, range determined using the method of FIG. 3 and range determined without compensation for tropospheric effects.

Referring to FIG. 6, an improvement in UERE due to troposphere by applying the method of FIG. 3 is schematically shown. Actual range between the satellite 36 and the electronic device 10 is identified by reference numeral 74 and range determined without tropospheric delay correction is identified by reference numeral 76. Reference numeral 80 represents range determined using the method of FIG. 3.

Figure 7:
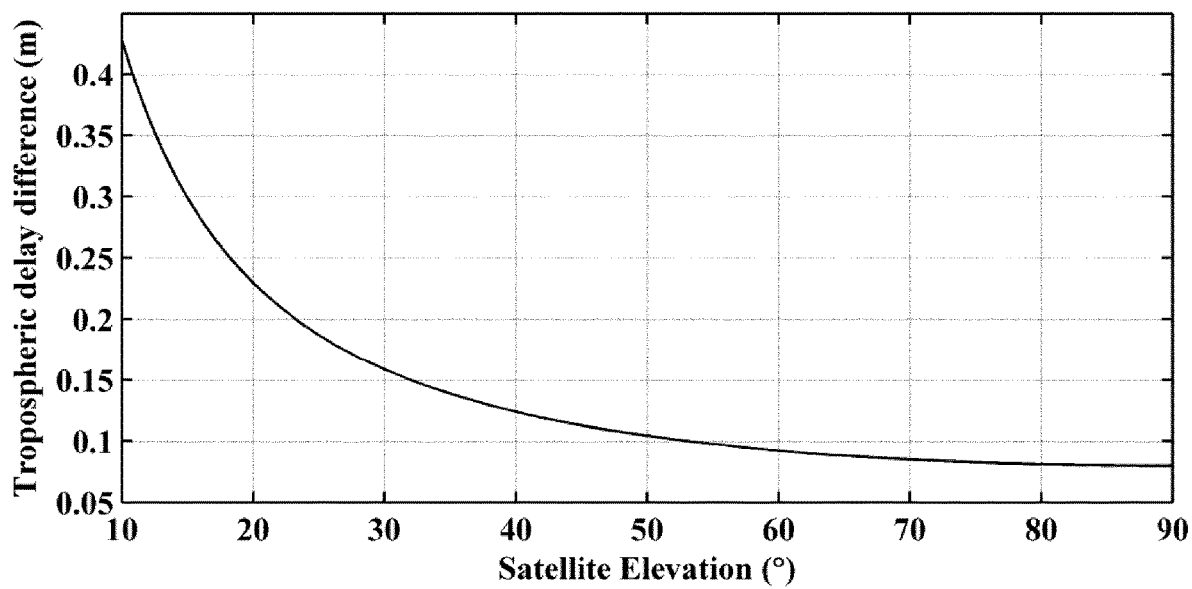
FIG. 7 is a graph depicting improvement in User Equivalent Range Error (UERE) using the method of FIG. 3 plotted against satellite elevation angle.

Referring also to FIG. 7, an improvement in UERE of the method of FIG. 3 over generally used tropospheric delay models is plotted against satellite elevation angle. Because the troposphere has a greater effect on the UERE at lower satellite elevations, the improvement due to application of the method of FIG. 3 is also greater at lower satellite elevations. For example, GNSS signals from a GNSS satellite 36 at a 15 degree elevation relative to an electronic device 10 may encounter up to 42 km of troposphere before arriving at a GNSS receiver of the electronic device 10. As such, the GNSS signal may pass through multiple weather systems. The method of FIG. 3 compensates for the delay experienced by the GNSS signals due to the multiple weather systems.

GNSS signals travelling from different GNSS satellites 36 at similar elevations may experience significantly different tropospheric effects due to different weather systems traversed. By taking into account local weather along the GNSS signal path, a more accurate location may be determined by the GNSS receiver of the electronic device 10.

Specific examples have been shown and described herein. However, modifications and variations may occur to those skilled in the art. All such modifications and variations are believed to be within the scope and sphere of the present disclosure.

The invention claimed is:

1. A method of reducing tropospheric effects in GNSS positioning, the method comprising:
determining, by a GNSS receiver of an electronic device, a first location of the electronic device at a first time;
determining a tropospheric delay by:
determining zenith delays for geographical areas along a single path of GNSS signal travel between a GNSS satellite and the first location of the electronic device, the zenith delays determined using current weather information of the geographical areas, the geographical areas traversed by the single path represented by cells of a grid, the cells comprising a selected size, each of the cells having a corresponding one of the zenith delays such that the zenith delays correspond to the cells that represent the geographical areas;
determining a distance over which a path delay is to be determined for each of the cells;
determining the path delay for each of the cells by adjusting a respective one of the zenith delays for each of the cells based on an elevation angle of the GNSS satellite relative to the electronic device to provide a plurality of path delays; and
summing the plurality of path delays to determine the tropospheric delay;
using the tropospheric delay to determine, by the GNSS receiver of the electronic device, a second location of the electronic device at a second time;
wherein the second location has a higher accuracy than the first location.

2. The method of claim 1, wherein the tropospheric delay is received by the electronic device.

3. The method of claim 1, wherein the current weather information is received from a server in communication with the electronic device and the tropospheric delay is determined at a processor of the electronic device.

4. The method of claim 1, wherein the tropospheric delay is determined at a server after receiving the first location and the first time from the electronic device, the tropospheric delay is then sent to the electronic device.

5. The method of claim 1, wherein the current weather information comprises pressure at mean sea level, relative humidity and temperature.

6. The method of claim 1, wherein the zenith delays for the cells are calculated using one or more of: Modified Hopfield and Black and Eisner delay models.

7. The method of claim 1, wherein the size of the cells is between 5 $km^2$ and 15 $km^2$.

8. The method of claim 7, wherein the size of the cells is approximately 13 $km^2$.

9. The method of claim 1, wherein the current weather information is updated at approximately 10 minute intervals.

10. A non-transitory computer-readable medium having computer-readable code stored thereon, the computer-readable code executable by at least one processor to perform the method of claim 1.

11. An electronic device comprising:
a GNSS receiver to determine a first location of the electronic device at a first time;
a processor in communication with the GNSS receiver, the processor determining a tropospheric delay by:

determining zenith delays for geographical areas along a single path of GNSS signal travel between a GNSS satellite and the first location of the electronic device, the zenith delays determined using current weather information of the geographical areas, the geographical areas traversed by the single path represented by cells of a grid, the cells comprising a selected size, each of the cells having a corresponding one of the zenith delays such that the zenith delays correspond to the cells that represent the geographical areas;

determining a distance over which a path delay is to be determined for each of the cells;

determining the path delay for each of the cells by adjusting a respective one of the zenith delays for each of the cells based on an elevation angle of the GNSS satellite relative to the electronic device to provide a plurality of path delays; and summing the plurality of path delays;

wherein, using the tropospheric delay, the GNSS receiver determines a second location of the electronic device at a second time, the second location has a higher accuracy than the first location.

12. The electronic device of claim 11, wherein the current weather information is received from a server and comprises pressure at mean sea level, relative humidity and temperature.

* * * * *